Figure 1:
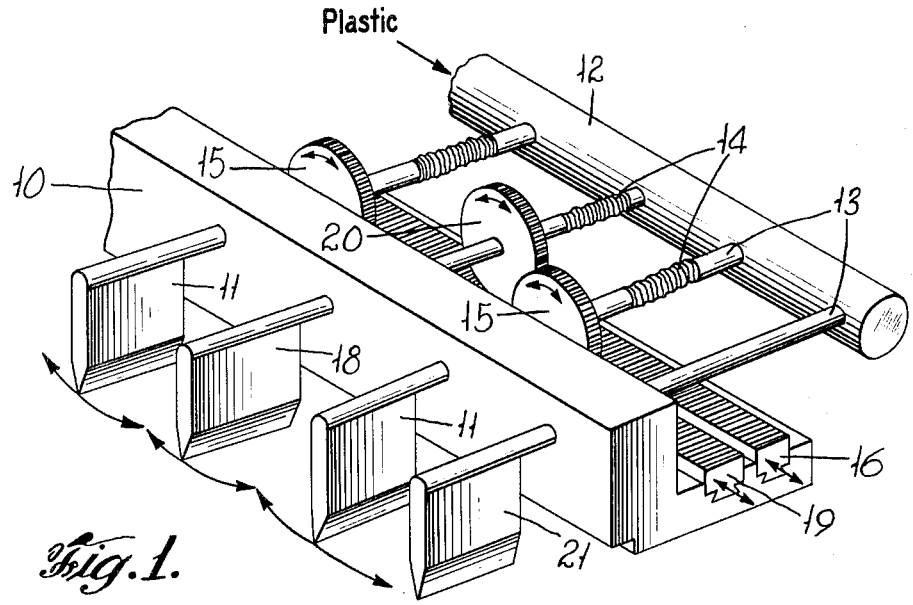

April 19, 1966  R. D. SCHULTHEISS  3,247,039
METHOD AND APPARATUS PRODUCING HONEYCOMB STRUCTURE
Filed May 20, 1959  3 Sheets-Sheet 1

INVENTOR.
RALPH D. SCHULTHEISS
BY Ramon A. Klitzke
ATTORNEY

April 19, 1966   R. D. SCHULTHEISS   3,247,039
METHOD AND APPARATUS PRODUCING HONEYCOMB STRUCTURE
Filed May 20, 1959   3 Sheets-Sheet 2

INVENTOR.
RALPH D. SCHULTHEISS
BY Ramon A. Klitzke
ATTORNEY

April 19, 1966     R. D. SCHULTHEISS     3,247,039
METHOD AND APPARATUS PRODUCING HONEYCOMB STRUCTURE
Filed May 20, 1959     3 Sheets-Sheet 3
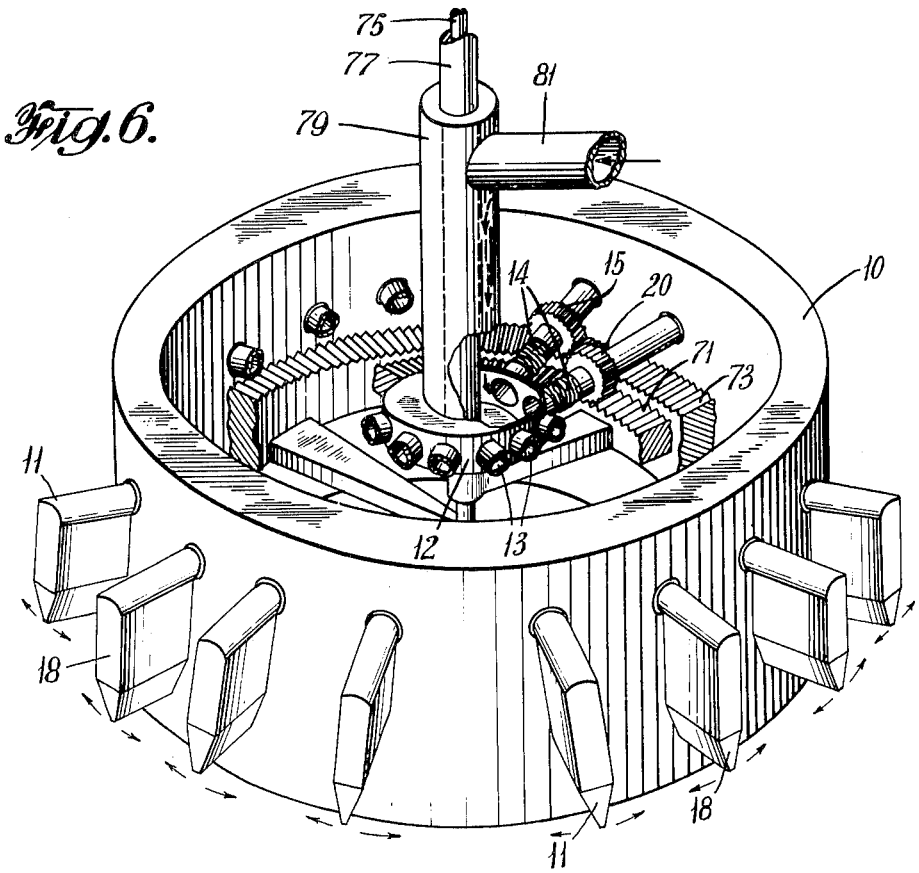
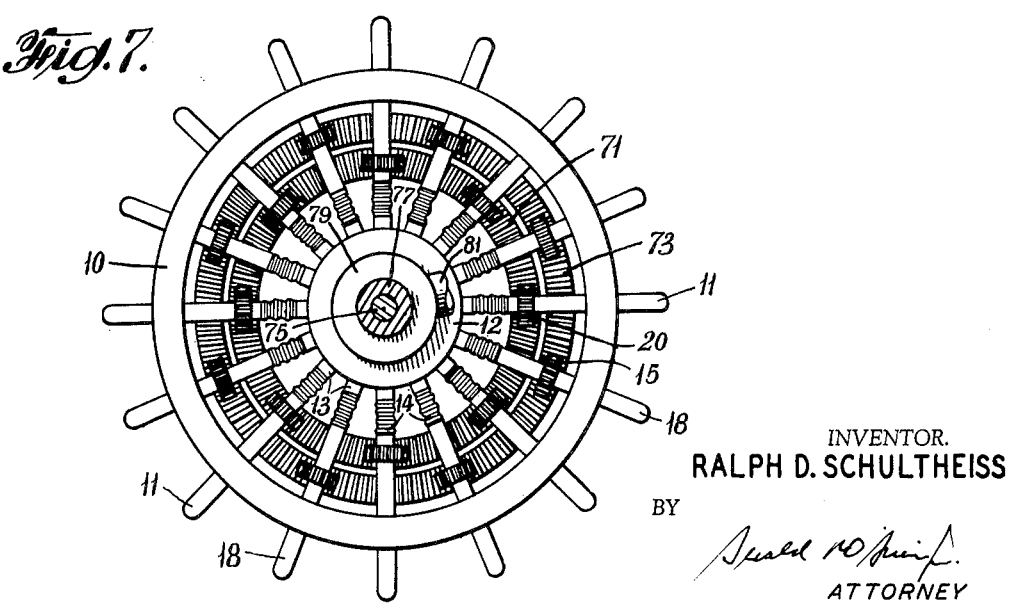
INVENTOR.
RALPH D. SCHULTHEISS
BY
ATTORNEY

United States Patent Office 3,247,039
Patented Apr. 19, 1966

3,247,039
METHOD AND APPARATUS FOR PRODUCING
HONEYCOMB STRUCTURE
Ralph D. Schultheiss, Springdale, Conn., assignor to
Union Carbide Corporation, a corporation of New
York
Filed May 20, 1959, Ser. No. 814,476
10 Claims. (Cl. 156—167)

This invention relates to a method and apparatus for producing a plastic honeycomb structure. More particularly, this invention relates to a method and apparatus for producing a plastic honeycomb structure having extruded interior ribs in a single continuous extrusion operation.

It is known to extrude polymeric materials in the shape of ribbons or films out of a metal die. Straight thermoplastic sheets have also been extruded and various other cross-sectional shapes can be produced. It is also known to extrude plastic materials out of dies and then work the materials by stretching, stamping, cutting or spinning so as to produce various shapes and forms of varying strength and usefulness. Attempts to produce an extruded shape having open spaces therein effected during the extrusion without the need for any auxiliary working or processing have, however, not proved satisfactory. More specifically, an efficient means of producing a plastic honeycomb structural board in one extrusion step, as is accomplished by the present invention, has never been devised.

It is an object of this invention to provide a method for producing a structure by extruding plastic ribbons without the need of additional processing steps.

It is also an object of this invention to provide a method for producing a plastic structure bonded together near the point of extrusion.

A further object of the invention is to provide an apparatus for producing a plastic structure.

Another object of this invention is to provide an apparatus for bonding extruded polymeric ribbons together near the point of extrusion.

It is a further object of this invention to provide a method for stretching and orienting a polymeric structure in a heated bath.

Another object of this invention is to provide a method and apparatus for producing a plastic honeycomb structure having interior ribs and air spaces.

It is a further object of this invention to provide a method and apparatus for providing an integrated plastic honeycomb structure which is strong and light by extruding plastic strips from movable extrusion dies.

Other objects and advantages of the invention will become apparent from the following description and appended claims.

According to the present invention, ribbons or strips of plastic are extruded from oscillating extruders whereby said strips are alternately contacted and spread apart as extrusion continues so as to be attached at intermittent points and form thereby an integrated honeycomb structure. Outside membranes or layers of plastic, plywood, sheet metal, fiber board, etc. may be extruded or fastened onto the honeycomb structure so as to completely enclose it and produce a structural board.

In the preferred embodiment of the invention plastic strips are melt extruded from extruders arranged in a straight line. The strips from adjacent extruders flow together when the extruder tips converge and separate when the extruder tips diverge. When they flow together, the strips are securely bonded together. Upon such bonding, a strong, attractive plastic structural board is produced having adjacent strips attached to each other at some angle, depending on the speeds of oscillation of the extruders and the rate of extrusion. It is preferable to extrude the strips in a downward direction so that they can flow together more readily but the invention will operate with extrusion upwardly or in other directions, also.

The invention will now be explained in detail with reference to the drawings in which:

FIG. 1 is an isometric view of an apparatus for carrying out the invention.

Figure 2:
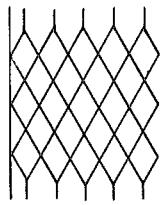
Figure 4:
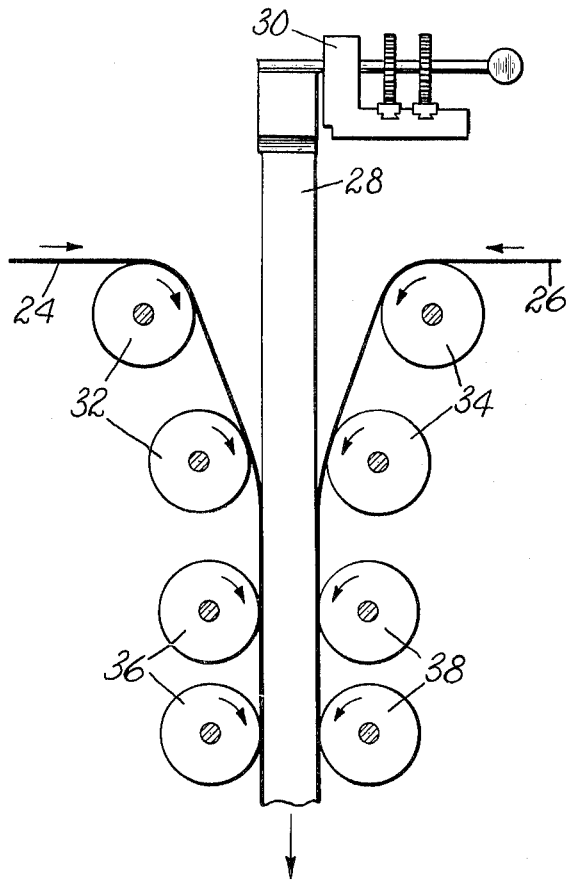
Figure 5:
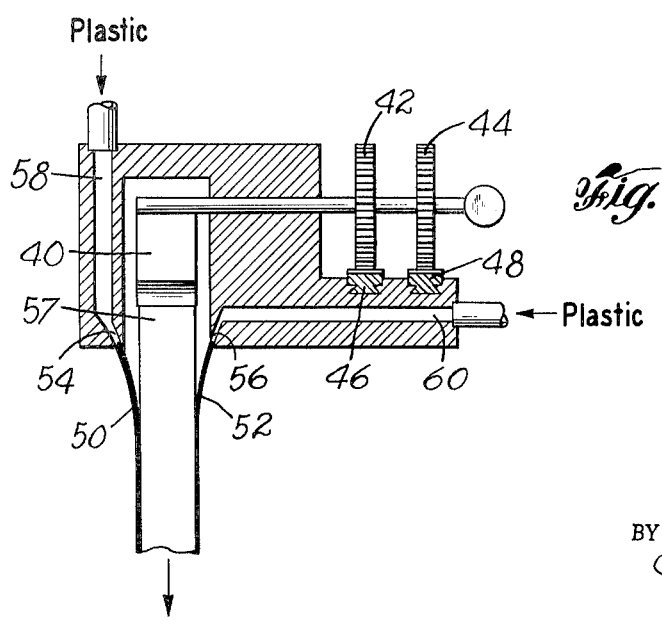

FIG. 2 is a plan view of one type of honeycomb structure producible by the invention, FIG. is a plan view of a second type of honeycomb structure producible by the invention, FIG. 4 is an elevational view of the apparatus of FIG. 1 used in combination with additional apparatus, FIG. 5 is a cross-sectional view of a modification of the apparatus of FIG. 1, FIG. 6 is an isometric view of modified apparatus for carrying out the invention with the extruders arranged in a circle, and FIG. 7 is a plan view of the apparatus of FIG. 6.

Figure 3:
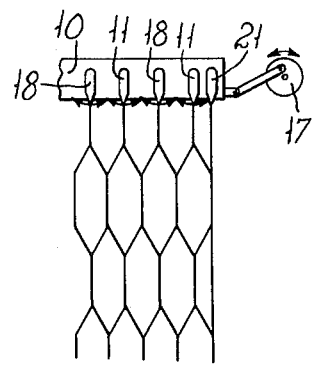

Referring now to FIGS. 1 and 3, a supporting member 10 holds rotatable ribbon extruders 11 and 18 together with actuating gears 15 and 20 for partially rotating said extruders. The number of extruders 11 and 18 employed determines the width of the honeycomb structure to be produced. The length of each of the extruders 11 and 18 determines the final thickness of the honeycomb structure and this thickness can be varied considerably without affecting the operation of the invention.

Extrudable plastic is fed to manifold 12 from which it flows through tubes 13 and bellows 14 into extruders 11 and 18. The purpose of the flexible bellows 14 is to permit partial rotation of the extruders 11 and 18. Gears 15 and 20 partially rotate extruders 11 and 18, gears 15 and 20 being actuated by bar gears 16 and 19, which are reciprocated by suitable motive devices such as eccentric drive 17. Each of the bar gears 16 and 19 actuate alternate extruders. For example, bar gear 16 actuates gear 20 and extruders 18 and bar gear 19 actuates gears 15 and extruders 11. As adjacent extruders 11 and 18 converge, plastic strips issuing therefrom are contacted while still hot and are effectively bonded to each other. As adjacent extruders 11 and 18 diverge, the strips are spread apart so as to form the interior void spaces of the honeycomb structure. For good bonding, the strips should be contacted while not more than about 50° C. cooler than the extrusion temperature.

By adjusting the time cycle of the extruder oscillations, various honeycomb designs may be obtained such as those shown in FIGS. 2 and 3. The outside extruder 21 may be held motionless whereby a straight strip of plastic is extruded so as to form a closed edge for the structural board.

Where it is desired to produce a honeycomb structural board having unexposed interior ribs, enclosing plastic sheets may be heat bonded onto the honeycomb board by the method shown in FIG. 4. In FIG. 4 continuous structural board is produced by heat bonding plastic sheets 24 and 26 onto honeycomb structure 28 extruded from extrusion apparatus 30 which may be the apparatus of FIGS. 1 and 3, although it would not necessarily have to be. Rollers 32 and 34 guide the plastic sheets 24 and 26 to the honeycomb structure and rollers 36 and 38, which may be heated, contact the sheets with the honeycombs.

An alternate method of producing honeycomb structural board having enclosed faces is illustrated in FIG. 5. In FIG. 5 plastic strip extruders, the end one of which is shown at 40, are actuated by gears 42 and 44 and bar gears 46 and 48, according to the method discussed with reference to FIG. 1. In this modification and the apparatus of FIG. 1 plastic sheets 50 and 52 are extruded from slots 54 and 56, respectively, contiguous to the extruded honeycomb structures and continuously therewith. Molten plastic is supplied to slots 54 and 56 through manifolds 58 and 60, respectively and may or may not be of the same color or other characteristics as the plastic of the honeycomb structure 57. Rollers may be used to press the sheets 50 and 52 against the honeycomb structure 57 to more firmly bond them thereto. The extruded sheets should be contacted with the edges of the honeycomb structure when the sheets are not more than about 50° C. cooler than the extrusion temperature thereof for good bonding.

Where it is desired to produce a curved honeycomb structural board for use in tanks, pipes, cylinders, or drums, the extruders 11 and 18 can be arranged in a circle as shown in FIGS. 6 and 7. Ring gears 71 and 73 are attached to shafts 75 and 77, respectively, and are rotated in accordance with these two shafts. Shaft 77 forms an annulus with the pipe 79, through which the molten plastic flows to the manifold 12. The molten plastic flows into the pipe 79 from inlet 81. Extrudable plastic is thus fed to manifold 12 from which it flows through tubes 13 and bellows 14 into extruders 11 and 18.

The apparatus of FIGS. 4 and 5 could also be used to heat-bond plastic sheets 24 and 26 onto the circular honeycomb structure extruded from the apparatus of FIGS. 6 and 7. In FIG. 4, the rollers 36 could have convex surfaces for contacting the plastic sheet 24 with the honeycomb structure, and the rollers 38 could have concave surfaces for contacting sheet 26 with the honeycomb structure. In FIG. 5, the extruder 40 would be arranged in a circle and the plastic sheet extrusion slots 54 and 56 would also be circular in their lengths.

Following extrusion the honeycomb board can be further worked or stretched and may be cut into a great variety of shapes and sizes. For example, the honeycomb structure made by this invention may be passed into a heated liquid bath in which it may be stretched and oriented so as to increase its strength. Grippers may be located in this bath to which the structural board can be passed and there grippers can then stretch the board so as to orient the plastic therein. If the board is stretched in two directions, the strength thereof is thereby increased in two directions. The liquid bath provides heat for maintaining the polymeric material at its optimum orienting temperature.

In the case of some polymers, such as polyethylene terephthalate or poly m-xylylene adipamide, oriented polymeric structural board obtainable from the above orientation step is shrinkable at relatively low temperatures. If it is desired to crystallize or heat stabilize the board, i.e., render it substantially non-shrinkable up to temperatures of about 120° C., the oriented board can be held at its dimensions by grippers while simultaneously heating it to a temperature in excess of the second order transition temperature of the polymeric material but below the melting point thereof. This temperature is preferably that at which the crystallization rate is maximum.

For use in this invention, representative heats of extrusion, orientation and heat stabilization for various plastics are given in Table 1 below. It is emphasized that these temperatures are mere approximations and in no way limit the scope of this invention.

Table 1

| Material | Extrusion Temp., °C. | Orientation Temp., °C. | Heat Stabilization Temp., °C. |
| --- | --- | --- | --- |
| Polyethylene | 180–250 | 18–108 | 100 |
| Polyethylene DYNK [1] | 220 | 24 | |
| High density polyethylene | 200–250 | 95–100 | 100 |
| Polystyrene | 240–280 (nominal 275° C.) | 135 | 99 |
| Vinyl chloride and its copolymers. | 150–170 (nominal 160° C.) | 100 | 100 |
| Polypropylene | 200–250 | 115–135 | 100 |

[1] Polyethylene DYNK is produced by Union Carbide Plastics Company under high pressure and at an elevated temperature in the presence of a free-radical oxygen catalyst. It has a melt index as determined by the method described in ASTM D1238-52T of about 0.3 dgm./min. and a density of about 0.920 gram per cubic centimeter.

To obtain good orientation, low density polyethylene can be stretched to about 500% to 550% of its original size while high density polyethylene can be stretched to about 1000% of its original size. In general, the greater amount of stretching, the greater will be the strength obtained. The extruded plastic when initially extruded and suddenly cooled is in the amorphous state. The amorphous plastic is brittle and has low tensile strength. No appreciable crystallinity can be observed by means of X-ray diffraction analysis or by density measurements. The plastic cannot be readily drawn at room temperature and has very little shrinkage when relaxed and subjected to high temperatures.

The amorphous plastic can be converted to tough, highly shrinkable plastic by heating and stretching and orienting in the temperature range above the second-order transition temperature but below the temperature at which the polymer will tend to thin out without appreciable molecular orientation, i.e., at temperatures near the melting point of the resin. By second-order transition temperature is meant that temperature at which a discontinuity is noted in the first derivative of a primary thermodynamic quantity with respect to temperature, and is unaccompanied by the usual latent heat which appears in first-order transition temperatures. It is related to polymer fluidity and yield temperature. Some of the thermodynamic properties that can be observed in determining the second-order transition point are: specific volume, specific heat, density, index of refraction and modulus of elasticity.

The polymer composition and rate of heating affect the observed second-order transition temperature. The optimum orientation temperature and heating rate can be readily determined by simple empirical tests.

It is preferred to pass the structural board downwardly during the orientation stage to allow for uniform heating and stretching, although other directional movement such as upward, horizontal or angularly disposed will also produce the desired result. It is to be understood, of course, that the orientation of the board may be done in a separate step which can be combined with the step of extruding the board.

Oriented polyethylene structural board, obtained by the process herein described and subsequently oriented at temperatures above its second-order transition temperature, is clear, transparent, tough and shrinkable. It is also heat sealable. Biaxially oriented poly m-xylylene adipamide board can also be oriented above its second-order transition temperature of about 68° C. to produce a clear, tough structural board.

Polyethylene structural board that has been extruded and biaxially stretched and oriented according to this invention will shrink almost instantly upon immersion in hot water at temperatures about 125° F.

Where it is desired to provide board dimensionally stable to high temperatures, the polyethylene structural board can be heated to temperatures above its second-order transition temperature but below the temperature at which the plastic begins to lose molecular orientation and is crystallized under tension. This process will not be described in detail.

When extruded polyethylene is rapidly cooled to room temperature, amorphous plastic is obtained which shows very little tendency to crystallize over long periods of time. The amorphous plastic when heated to about its second-order transition temperature readily softens and changes from an inelastic substance to a rubbery, easily deformable and drawable material. In this drawable state, the polyethylene may be easily stretched by the application of relatively small forces to yield a highly oriented plastic. Even at its second-order transition temperature, the polyethylene crystallizes slowly.

Crystallization is readily initiated in oriented polyethylene as it is exposed to high temperatures. The rate of crystallization increases as the temperature rises to about 180° C. At temperatures above about 180° C. the rate of crystallization will tend to decrease. Also, at higher temperatures, viz. near the melting point, the plastic begins to lose some of the molecular orientation which had been imparted at the lower temperatures.

As has already been described, the oriented structural board can be heat stabilized by heating in a bath while passing it over a mandrel except that it is not stretched but is merely maintained at its dimensions. Heat is applied to the board only while it is being held at its dimensions by the grippers, as it would shrink if heated while not being so held.

The crystallized, biaxially oriented board is clear, tough, transparent, and dimensionally heat stable to temperatures up to 120° C. or higher depending upon degree of crystallization obtained.

The process herein described can be used to control the degree of shrinkage of the polyethylene board. The time and temperature to which the oriented board is subjected during the stabilization stage will determine the degree of shrinkage.

While this embodiment of the invention has been described with particular reference to polyethylene, it is to be understood that the invention is not restricted thereto.

Any extrudable material can be usd in this invention. Examples of such materials are:

Polyethylene
Polypropylene
Polyamide
Polyethylene terephthalate
Vinylidene resins and copolymers
Copolymers of ethylene and other olefins
Polyacrylonitrile and its copolymers
Vinyl chloride and its copolymers
Vinylacetate and its copolymers
Polystyrene The structural board of this invention readily lends itself to a great variety of uses. It can be used in its cylindrical shape for tanks, pipes, cylinders or drums. In its flat form, the honeycomb structural board is admirably suited for housing construction as the interior air spaces are excellent for heat insulation.

It is intended that the invention disclosed herein not be limited by the foregoing description but only by the scope of the appended claims.

What is claimed is:

1. A method for producing an extruded honeycomb structure comprising extruding a multiplicity of thermoplastic strips arranged in a row with the flat sides of said strips extending transversely to said row and parallel to each other; maintaining at least one of the end strips motionless in the direction transverse to the direction of extrusion and oscillating the remaining strips in a direction transverse to the direction of extrusion so as to periodically contact and separate the flat sides of adjacent strips while said strips are in the tacky state.

2. A method for producing a honeycomb structure which comprises the steps of concurrently extruding a multiplicity of thermoplastic strips; periodically contacting and separating the flat sides of adjacent strips while said strips are in the tacky state; extruding a thermoplastic sheet adjacent to and perpendicular with edges of said strips; contacting said sheet with the edges of said strips while said sheet is in the tacky state; extruding a second plastic sheet adjacent to and perpendicular with edges of said strips opposite to said edges to be contacted with said first-mentioned sheet; and contacting said second sheet with said opposite edges of said strips while said sheet is in the tacky state.

3. A method for producing an integrated plastic honeycomb structural board which comprises the steps of melt extruding a multiplicity of plastic strips, bonding said strips to each other by intermittently contacting the flat sides of said strips at spaced points while said strips are not more than about 50° C., cooler than the temperature of extrusion, extruding a plastic sheet adjacent to and perpendicular with edges of said bonded plastic strips, contacting said sheet with the edges of said strips while said sheet is not more than about 50° C. cooler than the temperature of extrusion thereof, extruding a second plastic sheet adjacent to and perpendicular with edges of said plastic strips opposite to edges to be contacted with said first mentioned plastic sheet, and contacting said second sheet with said opposite edges of said strips, while said sheet is not more than about 50° C. cooler than the temperature of extrusion thereof.

4. Apparatus for producing an extruded honeycomb structure comprising, in combination, a support member; a multiplicity of strip extruders movably mounted on said support member in a single row with the slots of said extruders extending transversely to said row and parallel to each other; means for supplying extrudable plastic material to said extruders; and driving means for oscillating said extruders in a direction transverse to the direction of extrusion to cause adjacent extrusion slots to be converged into side by side proximity and diverged in sequence so as to periodically contact and separate the flat sides of strips extruded from adjacent extruders while maintaining at least one of the end extruders in a nonoscillating condition.

5. An apparatus for producing a plastic honeycomb structure which comprises, in combination, a support member, a multiplicity of plastic strip extruders having extrusion slots, said strip extruders being movably mounted on said support member and disposed so that said extrusion slots are substantially parallel, means for oscillating said extruders so that adjacent extrusion slots can be alternately converged and diverged, means for supplying extrudable plastic to said slots, and means for attaching sheet plastic to the edges of plastic strips extruded from said extrusion slots so as to be substantially perpendicular to and enclosing said strips.

6. An apparatus for producing a plastic honeycomb structure which comprises, in combination, a support member, a multiplicity of plastic strip extruders having strip extrusion slots, said strip extruders being movably mounted on said support member and disposed so that said extrusion slots are substantially parallel, means for oscillating said extruders so that adjacent extrusion slots can be alternately converged and diverged, means for supplying extrudable plastic to said slots, a sheet plastic extrusion slot disposed in said support member substantially perpendicular to and adjacent to the ends of said strip extrusion slots, and a second sheet plastic extrusion slot disposed in said support member substantially perpendicular to and adjacent to the ends of said strip extrusion slots opposite to said first-mentioned sheet plastic extrusion slot.

7. An apparatus for producing a plastic honeycomb structure which comprises, in combination, a support member, a multiplicity of plastic strip extruders having extrusion slots, said strip extruders being movably mounted on said support member and arranged in a circle so that said extrusion slots lie in lines passing through the center of said circle, means for oscillating said extruders so that adjacent extrusion slots can be alternately converged and diverged, means for supplying extrudable plastic to said slots and means for attaching sheet plastic to the edges of plastic strips extruded from said extrusion slots so as to be substantially perpendicular to and enclosing said strips.

8. An apparatus for producing a plastic honeycomb structure which comprises, in combination, a support member, a multiplicity of plastic strip extruders having strip extrusion slots, said strip extruders being movably mounted on said support member and arranged in a circle so that said extrusion slots lie in lines passing through the center of said circle, means for oscillating said extruders so that adjacent extrusion slots can be alternately converged and diverged, means for supplying extrudable plastic to said slots, a sheet plastic extrusion slot disposed in said support member substantially perpendicular to and adjacent to the ends of said strip extrusion slots and a second sheet plastic extrusion slot disposed in said support member substantially perpendicular to and adjacent to the ends of said strip extrusion slots opposite to said first-mentioned sheet plastic extrusion slot.

9. Apparatus for extruding a netting of plastic material comprising, in combination, a source of plastic material; a hollow die head connected to said source to receive said plastic material; a plurality of nozzles, at least some of which are swingably mounted on the die head and all of which are adapted to receive the plastic material from the interior of said die head, all of said nozzles being adapted to discharge the plastic material from their discharge ends outside the die head as continuous extruded running lengths; pairs of said nozzles being constructed and arranged to contact each other at their outer discharge ends at one end of the arc of swing and during such contact to weld two adjacent plastic lengths together as said plastic lengths are extruded from contacting nozzles; and power means to swing said swingably mounted nozzles back and forth according to a predetermined time sequence.

10. The invention defined in claim 9 wherein the nozzles are arranged in a straight row, and the two nozzles at the opposite ends of the row are fixed and are intermittently contacted by the respectively adjacent nozzles as they swing, all the other nozzles in the row being swingable through arcs.

References Cited by the Examiner

UNITED STATES PATENTS

| 1,152,978 | 9/1915 | Royle | 18—14 |
| 2,502,514 | 4/1950 | Ewer | 156—167 |
| 2,828,235 | 3/1958 | Holland et al. | |
| 2,919,467 | 1/1960 | Mercer | 18—12 |

FOREIGN PATENTS

| 552,251 | 11/1956 | Belgium. |
| 550,287 | 12/1957 | Canada. |
| 17,549 | 1898 | Great Britain. |
| 182,336 | 3/1950 | Japan. |

ALEXANDER WYMAN, *Primary Examiner.*

WILLIAM J. STEPHENSON, CARL F. KRAFFT,
*Examiners.*